(12) United States Patent
Escobedo et al.

(10) Patent No.: US 9,495,069 B2
(45) Date of Patent: Nov. 15, 2016

(54) EXPANDED ICON FUNCTIONALITY

(75) Inventors: Miguel Angel Escobedo, Austin, TX (US); Joseph Ross Abel, Austin, TX (US)

(73) Assignee: PayPal, Inc., San Jose, CA (US)

( * ) Notice: Subject to any disclaimer, the term of this patent is extended or adjusted under 35 U.S.C. 154(b) by 316 days.

(21) Appl. No.: 13/601,458

(22) Filed: Aug. 31, 2012

(65) Prior Publication Data

US 2014/0068516 A1 Mar. 6, 2014

(51) Int. Cl.
G06F 3/048 (2013.01)
G06F 3/0481 (2013.01)
G06F 3/0482 (2013.01)

(52) U.S. Cl.
CPC .......... *G06F 3/04817* (2013.01); *G06F 3/0482* (2013.01)

(58) Field of Classification Search
CPC .......................... G06F 3/0482; G06F 3/04817
USPC ........................................ 715/835, 837, 845
See application file for complete search history.

(56) References Cited

U.S. PATENT DOCUMENTS

| | | | | |
|---|---|---|---|---|
| 6,037,928 | A * | 3/2000 | Nachinson et al. | 345/156 |
| 7,603,629 | B1 * | 10/2009 | Crosswhite et al. | 715/772 |
| 8,136,045 | B2 * | 3/2012 | Miura et al. | 715/764 |
| 8,392,849 | B2 * | 3/2013 | Jung | 715/837 |
| 2002/0033844 | A1 * | 3/2002 | Levy et al. | 345/744 |
| 2002/0089535 | A1 * | 7/2002 | Morrell, Jr. | 345/738 |
| 2002/0091739 | A1 * | 7/2002 | Ferlitsch et al. | 707/526 |
| 2002/0178234 | A1 * | 11/2002 | Birchley | 709/217 |
| 2003/0221167 | A1 * | 11/2003 | Goldstein et al. | 715/513 |
| 2004/0212617 | A1 | 10/2004 | Fitzmaurice et al. | |
| 2005/0039144 | A1 * | 2/2005 | Wada et al. | 715/840 |
| 2006/0064648 | A1 * | 3/2006 | Makela | 715/808 |
| 2007/0083829 | A1 * | 4/2007 | Lauridsen et al. | 715/847 |
| 2007/0124677 | A1 * | 5/2007 | de los Reyes et al. | 715/705 |
| 2007/0157125 | A1 * | 7/2007 | Peters | 715/837 |
| 2009/0019398 | A1 * | 1/2009 | Hansson et al. | 715/838 |
| 2009/0178006 | A1 * | 7/2009 | Lemay et al. | 715/835 |
| 2009/0183100 | A1 | 7/2009 | Eom et al. | |
| 2009/0287604 | A1 * | 11/2009 | Korgav et al. | 705/40 |

(Continued)

OTHER PUBLICATIONS

Soper, Mark Edward. Sams Teach Yourself Microsoft Windows® 7 in 10 Minutes. Sams, 2010. Safari books. http://techbus.safaribooksonline.com/book/operating-systems/9780132121897?bookview=overview.*

(Continued)

*Primary Examiner* — Jennifer To
*Assistant Examiner* — John Repsher, III
(74) *Attorney, Agent, or Firm* — Haynes and Boone, LLP

(57) ABSTRACT

A method for providing expanded icon functionality includes displaying a primary icon using a display device. The primary icon is associated with a primary icon function in a storage device and the primary icon function is performed in response to a first user action directed to the primary icon. A second user action that is different from the first user action is received that is directed to the primary icon and, in response, at least one secondary icon that is associated with the primary icon and the second user action in the storage device is retrieved. The at least one secondary icon is displayed using the display device. Each at least one secondary icon is associated with a respective secondary icon function in the storage device, and in response to a selection of a secondary icon, the respective secondary icon function is performed.

20 Claims, 12 Drawing Sheets

(56) References Cited

U.S. PATENT DOCUMENTS

| | | | |
|---|---|---|---|
| 2009/0327955 A1 | 12/2009 | Mouilleseaux et al. | |
| 2010/0083150 A1* | 4/2010 | Nurmi et al. | 715/764 |
| 2010/0299637 A1 | 11/2010 | Chmielewski et al. | |
| 2010/0315358 A1* | 12/2010 | Chang et al. | 345/173 |
| 2011/0035691 A1 | 2/2011 | Kim | |
| 2011/0279415 A1 | 11/2011 | Marggraff et al. | |
| 2012/0030624 A1* | 2/2012 | Migos | 715/830 |
| 2012/0127080 A1* | 5/2012 | Kushler et al. | 345/168 |
| 2012/0240082 A1* | 9/2012 | Chen | 715/823 |
| 2013/0053105 A1* | 2/2013 | Lee et al. | 455/565 |
| 2013/0061172 A1* | 3/2013 | Huang et al. | 715/808 |
| 2013/0091467 A1* | 4/2013 | Pallakoff et al. | 715/835 |
| 2013/0132906 A1* | 5/2013 | Siurumaa et al. | 715/835 |
| 2014/0047390 A1* | 2/2014 | Thorsander et al. | 715/835 |

OTHER PUBLICATIONS

"Pin Wesbites' bookmarks in Tasklist for Quickest Access [Windows 7]." TipsoTricks, Archived Oct. 3, 2010. Accessed Web. Jun. 8, 2016. http://www.tipsotricks.com/2010/10/pin-wesbites-bookmarks-in-tasklist-for-quickest-access.html.*
International Search Report mailed Mar. 19, 2014 in corresponding PCT Patent Application No. PCT/US2013/057522, 4 pages.
European Extended Search Report issued Jun. 3, 2016 in corresponding EP Patent Application No. 13832523.8, 6 pages.

* cited by examiner

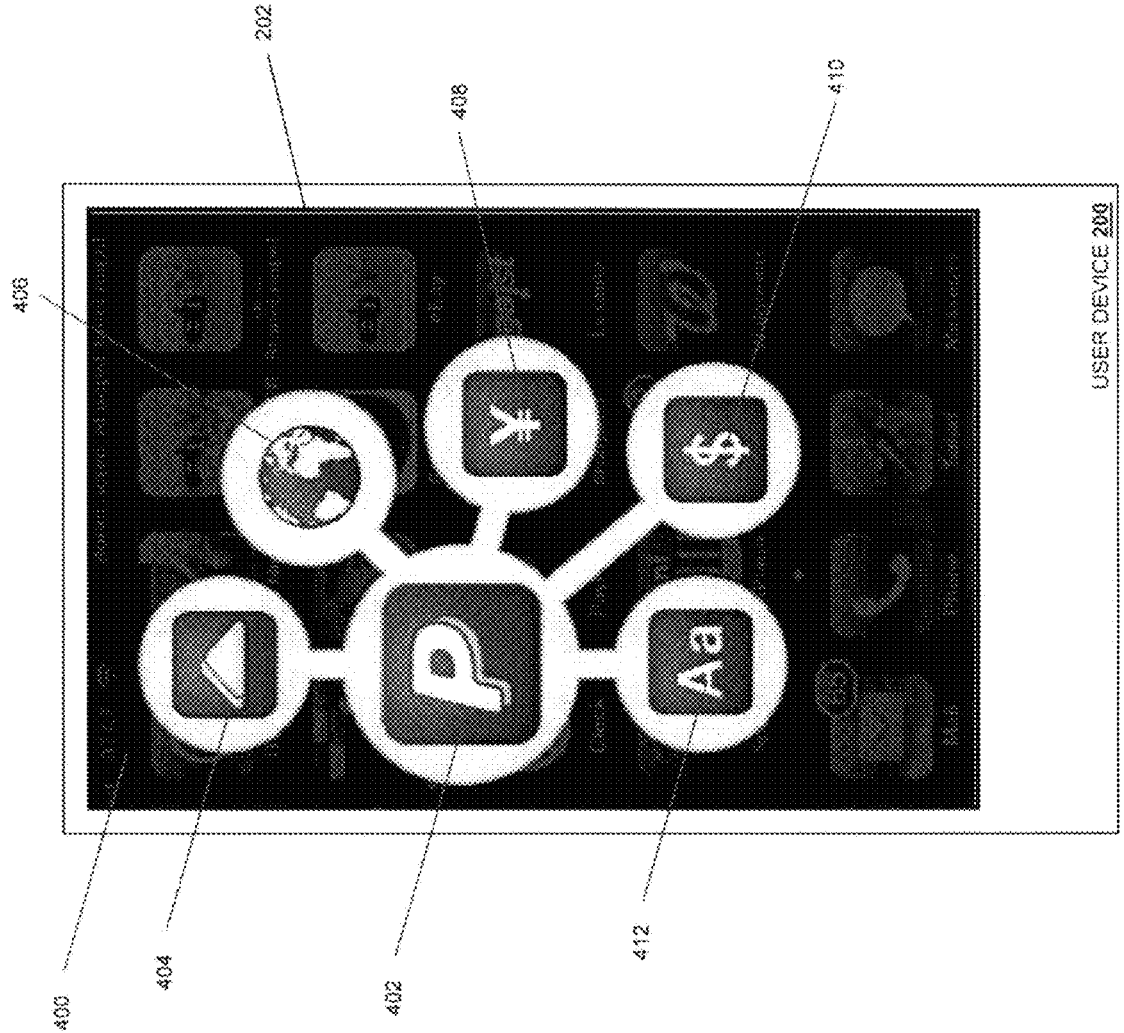

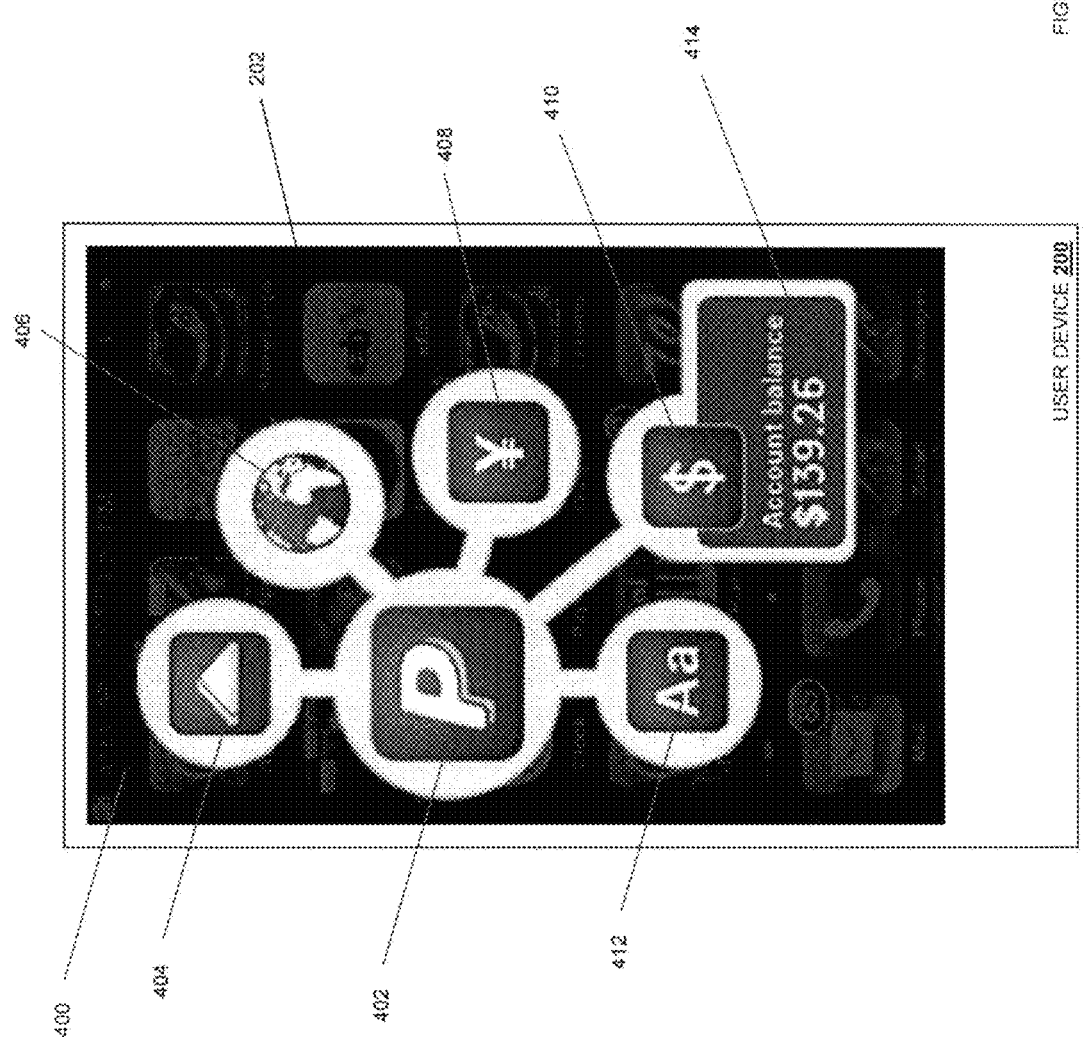

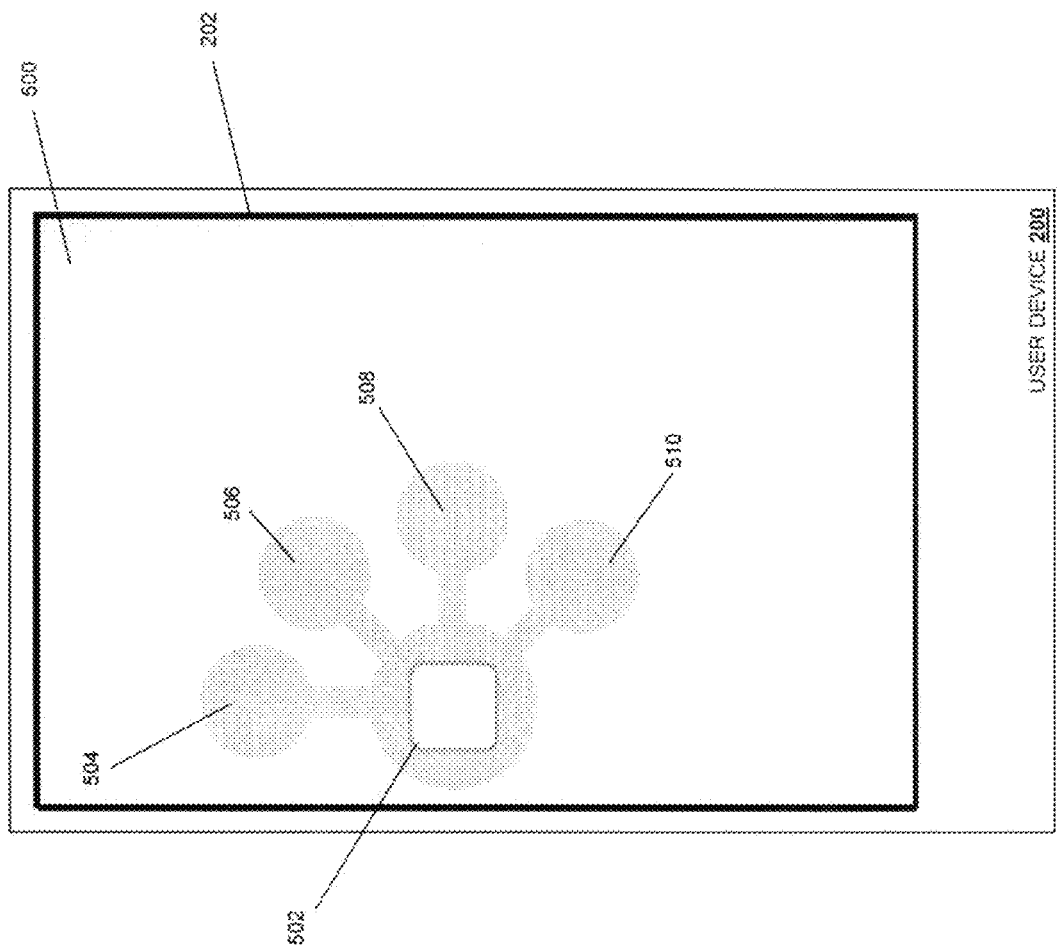

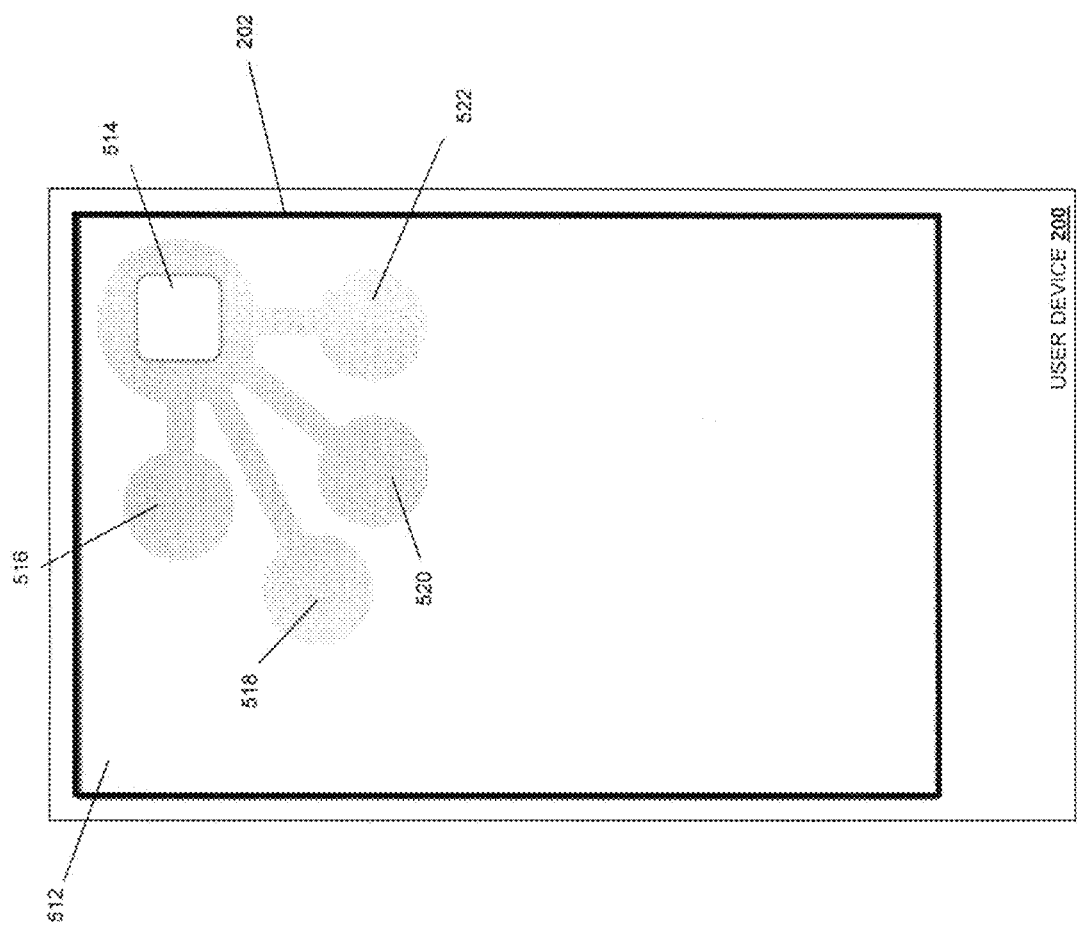

EXPANDED ICON FUNCTIONALITY

BACKGROUND

1. Field of the Invention

The present invention generally relates to computing devices and more particularly to expanded icon functionality for use with a computing device.

2. Related Art

The use of computing devices such as, for example, desktop computers, laptop computers, tablet computers, mobile phone computers, and/or a variety of other computing devices known in the art, is becoming ubiquitous. With the rising popularity of mobile computing, users may interact with computing devices throughout their day in order to retrieve and/or provide information for a variety of reasons. As such interactions become more and more frequent, it becomes desirable to make those interactions as quick and efficient as possible.

One way in which user/computing device interactions have been made quicker and more efficient is through the use of icons, or graphical symbols, which may represent an application, a user-created shortcut, and/or a variety of other icon represented entities known in the art. The icons are then displayed on the computing device (e.g., by an operating system) for selection by the user. When a user wishes to use an application, shortcut, or other icon represented entity, they simply select the associated icon in order to provide instructions to the computing device to launch the application, open the shortcut, and/or otherwise execute instructions for a desired icon represented entity.

However, a user may still need to go through a number of manual steps each time an icon is selected. For example, a user that typically uses a particular function of an application regularly may need to go through the same repetitive steps each time they wish to access that application function: select the application icon, wait for the application to load, then navigate through the application until the particular function is available. In another example, a user that typically uses a particular section of a website to which they have created a shortcut may need to go through similar steps each time they wish to use that section of the website: select the website shortcut icon, wait for the website to load, then navigate through the website until the particular section of the website is available. These repetitive steps to get to the functionality desired by the user are inefficient and create a negative user experience.

Thus, there is a need for an improved icon system.

SUMMARY

According to one embodiment, a method for providing expanded icon functionality includes associating secondary icons with a primary icon and a second user action in a storage device. When a first user action is directed to the primary icon, a primary icon function is performed. The primary icon function may include, for example, launching an application or a primary webpage on a website. When the second user action is directed to the primary icon, the secondary icons are retrieved and displayed. When one of the secondary icons is selected, a secondary icon function is performed. The secondary icon function may include, for example, a particular function performed by an application or the launching a secondary webpage on a website.

In an embodiment, the positioning of the secondary icons may be determined dynamically based on the location of the primary icon and/or the number of secondary icons associated with the primary icon, which allows the display of the secondary icons to be optimized for a display device being used.

As a result, a user may create a number of secondary icons that allow the user to access or quickly reference functions of an application or webpages on a website, which provides for quicker and more efficient interactions with the user device.

These and other features and advantages of the present disclosure will be more readily apparent from the detailed description of the embodiments set forth below taken in conjunction with the accompanying figures.

BRIEF DESCRIPTION OF THE FIGURES

FIG. 4a is a front view illustrating an embodiment of a user device being used to display a plurality of secondary icons in response to a second user action directed to a primary icon;

FIG. 4b is a front view illustrating an embodiment of a user device performing a secondary icon function in response to receiving a selection of a secondary icon;

FIG. 5a is a front view illustrating an embodiment of a user device being used to display a plurality of secondary icons based on the location of a primary icon and a number of secondary icons associated with the primary icon.

FIG. 5b is a front view illustrating an embodiment of a user device being used to display a plurality of secondary icons based on the location of a primary icon and a number of secondary icons associated with the primary icon.

Figure 1:
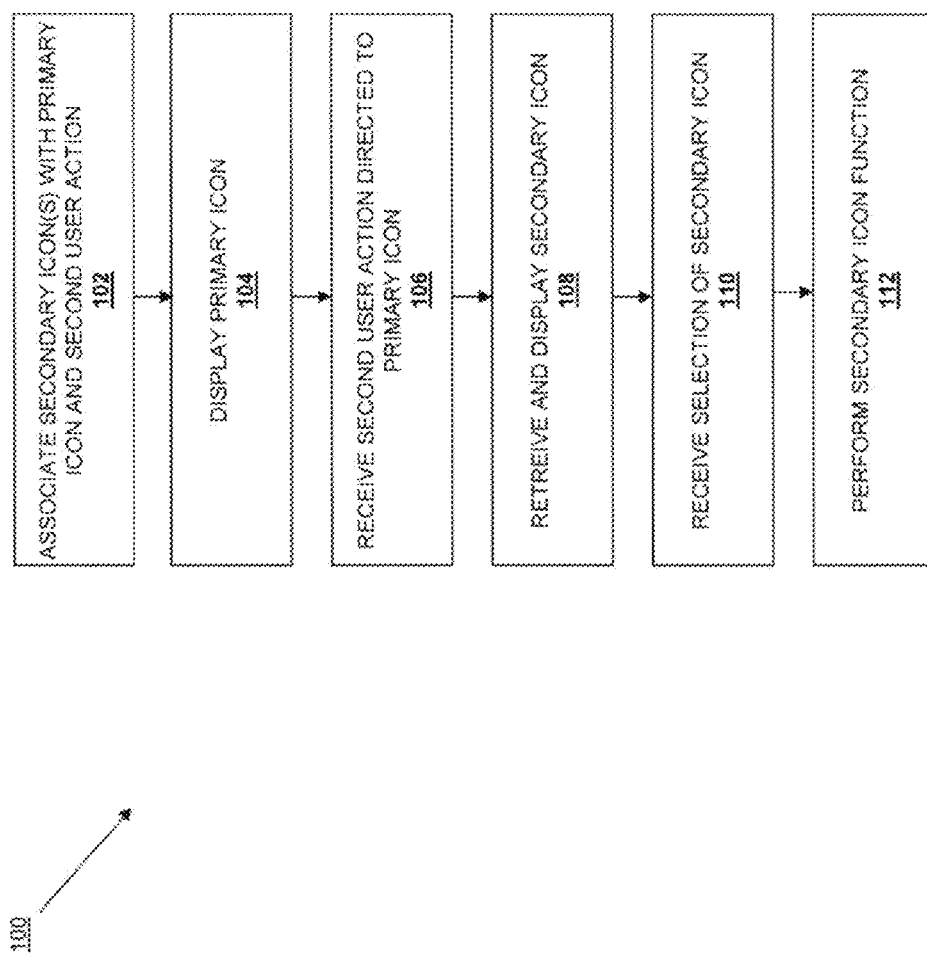
FIG. 1 is a flow chart illustrating an embodiment of a method for providing expanded icon functionality.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for providing expanded icon functionality. Secondary icons (and in some embodiments, tertiary icons, quaternary icons, and so on) are associated with a primary icon and a second user action in a storage device. In response to a first user action (e.g., a user "tap" action) directed to the primary icon, a primary icon function (e.g., launching an application, launching a primary webpage on a website, etc.) is performed. In response to the second user action directed to the primary icon, the secondary icons are retrieved and displayed, and when any of the secondary icons are selected, a respective secondary icon function is performed (e.g., performing a particular function of an application, launching a secondary webpage on a website, etc.) Such systems and methods allow for a user to quickly and easily instruct a user device to perform several different functions associated with a primary icon that conventionally requires the user to navigate through an application or website following selection of the primary icon.

Figure 2:
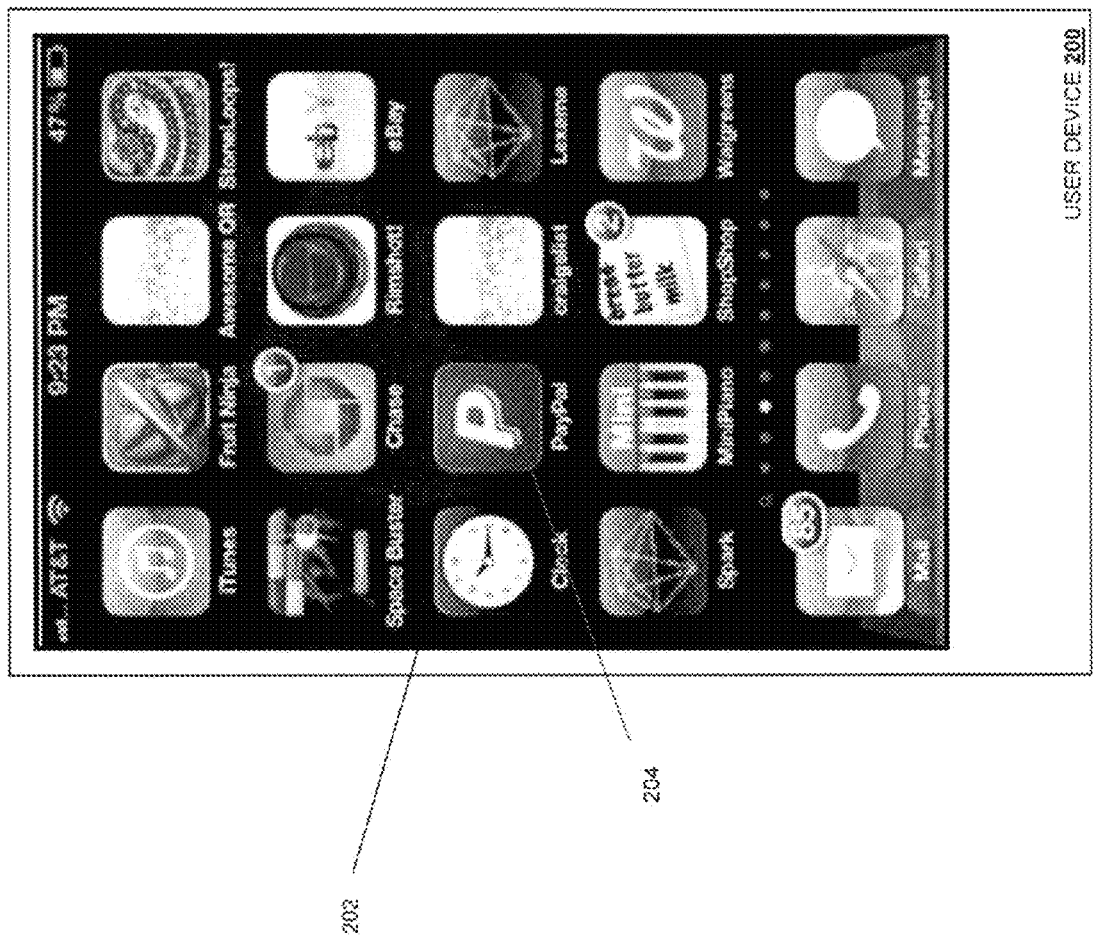
FIG. 2 is a front view illustrating an embodiment of a user device being used to display a plurality of primary icons.

Referring now to FIGS. 1 and 2, a method 100 for provided expanded icon functionality, which may also be referred to as "icon nodal interaction" herein, is illustrated. The embodiment of the method 100 described below is directed to a primary icon associated with a payment account of a user. For example, an account provider may provide a user with a payment account, and the user may use the primary icon to access the payment account to fund payments for purchases made from merchants, review details of the payment account, and/or perform a variety of other payment account activities known in the art. In another embodiment, a payment service provider such as, for example, PayPal, Inc. of San Jose, Calif. assists in the making of payments from the user to merchants by transferring funds from the payment account to a merchant account of the merchant, and the primary icon may allow the user to perform similar actions as discussed above for the payment account provided by the provider. However, these embodiments are meant to be merely exemplary, and one of skill in the art will recognize that a variety of modifications may be made to the system discussed below without departing from the scope of the present disclosure, including the use of the system with primary icons for any application, user-created shortcut, and/or other icon represented entity known in the art.

The method 100 begins at block 102 where a plurality of secondary icons are associated with a primary icon and a second user action. In the embodiment discussed below, a user having a user device 200, illustrated in FIG. 2, may access their payer account over a network (e.g., over the Internet) by selecting a primary icon to connect to an account provider device, a payment service provider device, an application provider device, and/or other devices known in the art. While the user device 200 is illustrated and described below as a mobile device such as, for example, a mobile phone or computer, one of skill in the art will recognize that the icon system discussed below may be provided on a desktop computer, on other computing systems connected to a network, and/or using a variety of other devices known in the art.

As illustrated in FIG. 2, the user device 200 includes a display screen 202 that is operable to display a plurality of primary icons including, for example, the primary icon 204. While the plurality of primary icons in FIG. 2 are displayed in a grid on a single screen, one of skill in the art will recognize that the primary icons may be displayed in any configuration and across any number of screens while remaining within the scope of the present disclosure. In the embodiment discussed below, the display screen 202 is a touch-sensitive input device that allows a user of the user device 200 to provide instructions and inputs to the user device 200 by touching the display screen 202.

In an embodiment, the user device 200 is operable to perform an associated primary icon function in response to receiving a first user action that is directed to a primary icon. For example, the primary icon 204 may be associated with a payment application as discussed above, and in response to a first user action directed to the primary icon 204 (e.g., a user "tap" action in which the user touches the display screen 202 a single time at a location on the display screen 202 where the primary icon 204 is displayed), the user device 200 may launch the payment application associated with the primary icon 204 such that the user may navigate through the payment application to access different functionality of the payment application. However, in other embodiments, the primary icon 204 may be associated with a user shortcut to a primary webpage of a website (e.g., a "homepage" of a website), and in response to the first user action the user device 200 may launch a web browser directed to the primary webpage such that the user may navigate through the website starting from the primary webpage. The user device 200 may be operable to perform an associated primary icon function for each of the primary icons in response to the same type of first user action (e.g., the user "tap" action) directed to the respective primary icon, thus allowing the user to provide instructions to the user device 200 to launch applications, user-created shortcuts, and/or other icon represented entities displayed on the display screen 102 using a first type of intuitive gesture. While a few examples of primary icon functions have been provided, one of skill in the art will recognize that any type of primary icon function with fall within the scope of the present disclosure.

Figure 3:
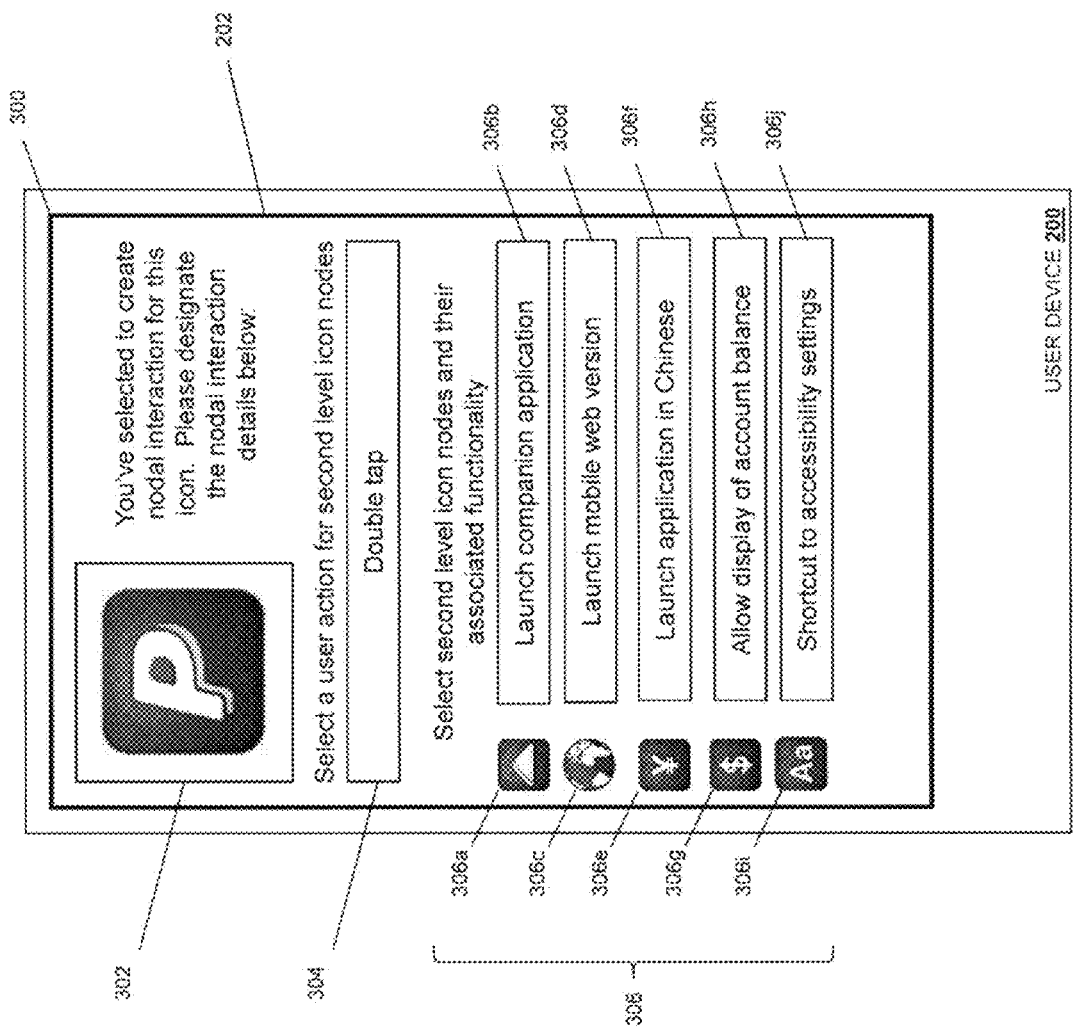
FIG. 3 is a front view illustrating an embodiment of a user device being used to display an expanded icon functionality set-up screen, including a primary icon, a plurality of secondary icons to associate with the primary icon, and associated secondary icon functionality for those secondary icons.

Referring to FIGS. 1, 2, and 3, at block 102 in the illustrated embodiment, the user may select the primary icon 204 using the first user action to instruct the user device 200 to launch the payment application associated with the primary icon 204. The user may then navigate through the payment application to an expanded icon functionality screen 300, illustrated in FIG. 3. The expanded icon functionality page 300 include an indication 302 of the primary icon that was selected (e.g., the primary icon 204 in FIG. 2) and that is having its icon functionality expanded according to the method 100. The expanded icon functionality screen 300 also includes a second user action input 304 that allows the user to select a second user action (e.g., a user "double tap" action in which the user touches the display screen 202 two times at a location on the display screen 202 where the desired icon is displayed) to be associated with the primary icon 204 and one or more secondary icons. The expanded icon functionality page 300 also includes a secondary icon section 306 that includes a plurality of secondary icon inputs that allows the user to associate secondary icons and secondary icon functions with each other, the second user action, and the primary icon.

In the illustrated embodiment, the secondary icon section 306 includes a secondary icon 306a that may be displayed on the display screen 202 in response to the user directing the second user action at the primary icon 204, along with a secondary icon function 306b that the user has selected that will provide the user device 200 instructions to launch a companion application to the payment application associated with the primary icon 204 when the secondary icon 306a is selected. For example, the payment application associated with the primary icon 204 may provide for management of a payment account of the user, while a companion application to the payment application may provide the user device 200 the ability to read credit cards for accepting payments, and thus the user may associate the secondary icon 306a for the companion application along with the secondary icon function 306b of launching the companion application with the primary icon 204 and the second user action in a storage device of the user device 200 at block 102 of the method 100. Such an expanded icon functionality may be useful for a user that uses both the payment application and companion application regularly and wishes to save space on the display screen 202 by associating the two applications and providing for accessing the companion application through icon nodal interactions with payment application icon.

In the illustrated embodiment, the secondary icon section 306 includes a secondary icon 306c that may be displayed on the display screen 202 in response to the user directing the second user action at the primary icon 204, along with a secondary icon function 306d that the user has selected that will provide the user device 200 instructions to launch an application web version of the payment application associated with the primary icon 204 when the secondary icon 306c is selected. For example, the payment application associated with the primary icon 204 may provide for accessing a payment account of the user through a relatively data intensive application, while a mobile web version of the payment application may provide for accessing that payment account through a relatively less data intensive webpage, and thus the user may associate the secondary icon 306c for the mobile web version of the payment application along with the secondary icon function 306d of launching the mobile web version of the payment application with the primary icon 204 and the second user action in a storage device of the user device 200 at block 102 of the method 100. Such an expanded icon functionality may be useful when a user finds themselves in an area where their network connection is slow and the use of a relatively less data intensive webpage version of the payment application will provide a better user experience than the relatively data intensive payment application.

In the illustrated embodiment, the secondary icon section 306 includes a secondary icon 306e that may be displayed on the display screen 202 in response to the user directing the second user action at the primary icon 204, along with a secondary icon function 306f that the user has selected that will provide the user device 200 instructions to launch the payment application associated with the primary icon 204 in another language and/or another currency when the secondary icon 306e is selected. For example, the payment application associated with the primary icon 204 may provide for accessing a payment account of the user in a first language (e.g., English) and/or currency (e.g., U.S. dollars) or a plurality of second languages (e.g., Chinese) and/or currencies (e.g., Yuan), and thus the user may associate the secondary icon 306e for the second language and/or currency version of the payment application along with the secondary icon function 306d of launching second language and/or currency version of the payment application with the primary icon 204 and the second user action in a storage device of the user device 200 at block 102 of the method 100. Such an expanded icon functionality may be useful when a user uses the payment application in a plurality of different countries having different currencies.

In the illustrated embodiment, the secondary icon section 306 includes a secondary icon 306g that may be displayed on the display screen 202 in response to the user directing the second user action at the primary icon 204, along with a secondary icon function 306h that the user has selected that will provide the user device 200 instructions to display a payment account balance for a payment account in the payment application associated with the primary icon 204 when the secondary icon 306g is selected. For example, the payment application associated with the primary icon 204 may provide for accessing a payment account balance of a payment account of the user, and thus the user may associate the secondary icon 306e for the payment account balance along with the secondary icon function 306d of displaying the payment account balance with the primary icon 204 and the second user action in a storage device of the user device 200 at block 102 of the method 100. Such an expanded icon functionality may be useful when a user checks their payment account balance regularly and/or wishes to be able to quickly and easily access their payment account balance.

In the illustrated embodiment, the secondary icon section 306 includes a secondary icon 306i that may be displayed on the display screen 202 in response to the user directing the second user action at the primary icon 204, along with a secondary icon function 306j that the user has selected that will provide the user device 200 instructions to launch an accessibility settings screen for the payment application associated with the primary icon 204 when the secondary icon 306i is selected. For example, the payment application associated with the primary icon 204 may provide for adjusting a plurality of settings of the payment application, and thus the user may associate the secondary icon 306e for the accessibility settings screen of the payment application along with the secondary icon function 306d of launching the accessibility settings screen with the primary icon 204 and the second user action in a storage device of the user device 200 at block 102 of the method 100. Such an expanded icon functionality may be useful when a user regularly changings accessibility settings for the payment application and/or wishes to be able to quickly and easily access their accessibility settings.

The associations of the primary icon, the second user action, the secondary icons, and the secondary icon functions may be stored in a storage device in the user device 200 or connected to the user device 200 through a network (e.g., via an account provider device, a payment service provider device, an application provider device, etc.) Thus, any or all of the primary icons may be associated with a second user action and one or more secondary icons and associated secondary icons functions in the storage device. While a few examples of secondary icons and secondary icon functions have been provided above, one of skill in the art will recognize that a plurality of different icon types and icon functions will fall within the scope of the present disclosure. For example, the primary icon may include user-created short cut to a primary webpage of a website (e.g., a "homepage"), and the user may select, for association with the second user action and primary icon, secondary icons with secondary icon functions that allow the user to open up secondary webpages of the website (e.g., webpages that conventionally would require the user to navigate to from the website homepage.)

Furthermore, while the second user action, secondary icons, and secondary icon functions have been described above as being set by the user of the user device 200, second user actions, secondary icons, and secondary icon functions may be set by a third party (e.g., an application developer, a website developer, a user device manufacturer, and/or a variety of other entities known in the art) while remaining within the scope of the present disclosure. For example, the icon nodal interaction involving the second user action, secondary icons, and secondary icon functions may be provided with associations to primary icons by application developers in application updates over the network to the user device 200.

Further still, third user actions, fourth user actions, and so on may be associated with the primary icon, any of the secondary icons, and or lower level icons in the expanded icon functionality system in a manner similar to the association of the second user action and secondary icons with the primary icon discussed above. For example, a third user action may include a user "triple tap" that requires a user to touch the display screen 202 three times at a location adjacent the display of an icon, and that third user action may be associated with one or more tertiary icons that are similar to the secondary icons and that are associated with tertiary icon functions that are similar to the secondary icon functions. Also, while the primary, secondary, and tertiary user actions have been described herein as "tap" actions that include single, double, and triple "taps", other user gestures or actions directed the primary icons, secondary icons, and other icons will fall within the scope of the present disclosure. For example, "swiping" (e.g., running a finger in a relatively straight line across the screen starting or crossing over an icon), "swirls" (e.g., running a finger in a relatively circular motion along the screen starting or cross over an icon), and/or a variety of other user gestures or actions are envisioned as falling within the scope of the present disclosure.

The method 100 then proceeds to block 104 where a primary icon is displayed. As discussed above, FIG. 2 illustrates the display of a plurality of primary icons in a grid, and the user device 200 is operable to perform a primary icon function for any of the primary icons in response to a first user action directed to that primary icon. While the method 100 below describes the function of the user device 200 in response to a second user action directed to the primary icon 204, any of the primary icons may be associated with the second user action as discussed above, and thus the actions performed according to the method 100 may apply to any of the primary icons displayed on the display screen 202 of the user device 200, and/or any icons displayed on any computing system known in the art.

The method 100 then proceeds to block 106 where a second user action that is directed to a primary icon is received. In an embodiment, the user may perform a second user action on the display screen 202 of the user device 200 that is directed to the primary icon 204, and the user device 200 receives that second user action. For example, the user may perform a user "double tap" action on a touch input display screen 202 that is at the location of the display of the primary icon 204 on the display screen 202. In another example, the user may user an input device such as, for example, a mouse or touch pad, to "double click" on or otherwise select the primary icon 204 with a second user action that is different from a primary user action that causes the user device 202 to perform the primary icon function associated with that primary icon 204. While a few examples of second user actions have been described, one of skill in the art will recognize that a variety of different user actions using a variety of different hardware and/or software will fall within the scope of the present disclosure, including but not limited to "taps", "clicks", "swipes", "swirls", and/or other user actions known in the art.

Referring now to FIGS. 1, 4a, and 4b, the method 100 then proceeds to block 108 where secondary icons are retrieved and displayed. In an embodiment, in response to receiving the second user action at block 106, the user device 200 accesses the storage device in the user device 200 and uses the primary icon to which the second user action was directed, along with the second user action received at block 106, to retrieve one or more secondary icons that are associated with the primary icon and second user action in the storage device. The user device 200 then displays the secondary icons on an expanded icon functionality screen 400 provided on the display screen 202 of the user device 200. The expanded icon functionality screen 400 includes a primary icon 402 (which may be the same as the primary icon 204 to which the second user action was directed at block 106 but, for example, enlarged in the illustrated embodiment), along with a plurality of secondary icons 404, 406, 408, 410, and 412 that are associated with that primary icon 402 and the second user action received at block 106. In the illustrated embodiment, the secondary icons 404, 406, 408, 410, and 412 may be the companion application icon 306a, the mobile web version icon 306c, the alternate language and/or currency icon 306e, the account balance icon 306g, and the accessibility settings icon 306i, respectively, discussed above with reference to FIG. 3. While in the illustrated embodiment, each of the secondary icons 404, 406, 408, 410, and 412 are displayed on the display screen 202 of the user device 200 as "nodes" connected to the primary icon 402, a variety of other secondary icon presentations will fall within the scope of the present disclosure.

The method 100 then proceeds to block 110 where a selection of a secondary icon is received. In an embodiment, upon being presented with the expanded icon 400, the user may select one of the secondary icons 404, 406, 408, 410, and 412 in order to instruct the user device 200 to perform a secondary icon function that is associated with that selected secondary icon. For example, the user may perform a user "tap" action on the secondary icon 404 in order to launch a companion application to the payment application that is associated with the primary icon 204/402. In another example, the user may perform a user "tap" action on the secondary icon 406 in order to launch a mobile web version to the payment application that is associated with the primary icon 204/402. In another example, the user may perform a user "tap" action on the secondary icon 408 in order to launch the payment application that is associated with the primary icon 204/402 in an alternate language and/or currency In another example, the user may perform a user "tap" action on the secondary icon 410 in order to cause an account balance 414 to be displayed for a payment account associated with the payment application that is associated with the primary icon 204/402, as illustrated in FIG. 4b. In another example, the user may perform a user "tap" action on the secondary icon 412 in order to launch an accessibility settings page associated with the payment application that is associated with the primary icon 204/402.

While a few examples of secondary icon functions have been provided, a wide variety of different secondary icon functions may be performed in response to the selection of a secondary icon. In the illustrated embodiment described above, selection of secondary icons are described as resulting in the immediate provision of companion applications, mobile web versions of applications, applications in a selected language and/or currency, information sections of applications such as a payment account balance, and settings pages of applications. However, as discussed above, secondary icons may be associated with a primary icon that is a user-created shortcut (e.g., to a primary webpage of a website), and selection of those secondary icons may result in the immediate provision of secondary webpages for the website (e.g., through a web browser) that are associated with (e.g., navigable to from) the primary webpage of the website. Furthermore, some secondary icons may have secondary icon functionality that is performed without explicit selection of that secondary icon. For example, in some embodiments the account balance 414 provided by the secondary icon 410 may be displayed and/or updated on the expanded icon functionality screen 400 without being selected by the user.

Thus, a system and method for providing expanded icon functionality has been described that allows a user to associated a second user action with primary icon and one or more secondary icons such that the second user action directed at the primary icon causes the secondary icons to be displayed for selection. Such a system and method allow the user to create one or more secondary icons or short cuts to quickly navigate to different functionality of an application, website, and/or other entity associated with the primary icon.

Figure 5C:
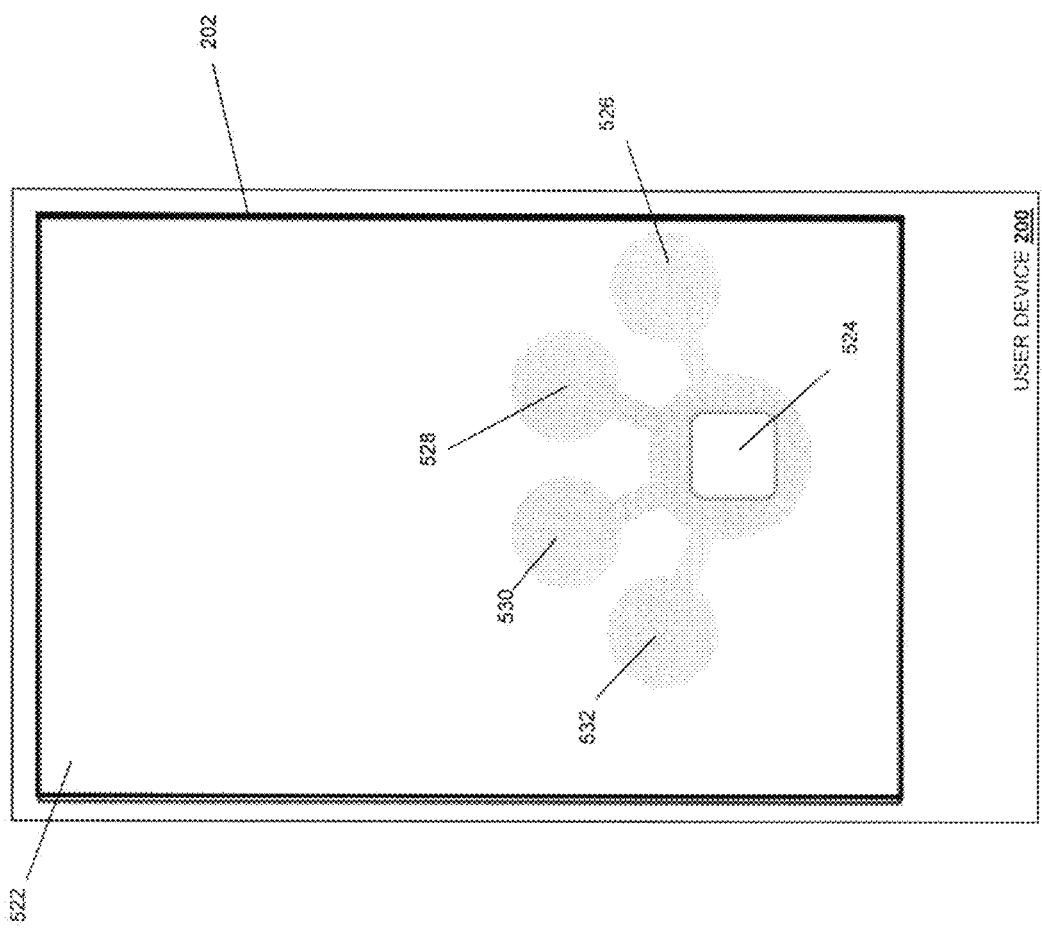
FIG. 5c is a front view illustrating an embodiment of a user device being used to display a plurality of secondary icons based on the location of a primary icon and a number of secondary icons associated with the primary icon.

Referring now to FIGS. 5a, 5b, and 5c, a plurality of secondary icon display options that are based on the position of the primary icon and/or the number of secondary icons associated with the primary icon are illustrated on different expanded icon functionality screens. FIG. 5a illustrates a first expanded icon functionality screen 500 having a primary icon 502 displayed at a first position relative to the display screen 202 on the user device 200. In an embodiment, based on the first position of the primary icon 502 and/or the number of secondary icons associated with that primary icon 502, each of the secondary icons 504, 506, 508, and 510 are displayed at second positions, illustrated in FIG. 5a. As can be seen in FIG. 5a, the second positions of the secondary icons 504, 506, 508, and 510 are spaced apart from the first position of the primary icon 502, and displayed using that first position such that all of the secondary icons 504, 506, 508, and 510 are visible on the display screen 202 of the user device 200. FIGS. 5b and 5c illustrate how the second positions of the secondary icons change with the first position of the primary icon. For example, FIG. 5b illustrates an expanded icon functionality screen 512 with a primary icon 514 located in a first position and a plurality of secondary icons 516, 518, 520, and 522 located at second positions that are spaced apart from the first position of the primary icon 514, and displayed using that first position such that all of the secondary icons 516, 518, 520, and 522 are visible on the display screen 202 of the user device 200. Similarly, FIG. 5c illustrates an expanded icon functionality screen 522 with a primary icon 524 located in a first position and a plurality of secondary icons 526, 528, 530, and 532 located at second positions that are spaced apart from the first position of the primary icon 524, and displayed using that first position such that all of the secondary icons 526, 528, 530, and 532 are visible on the display screen 202 of the user device 200.

Figure 6:
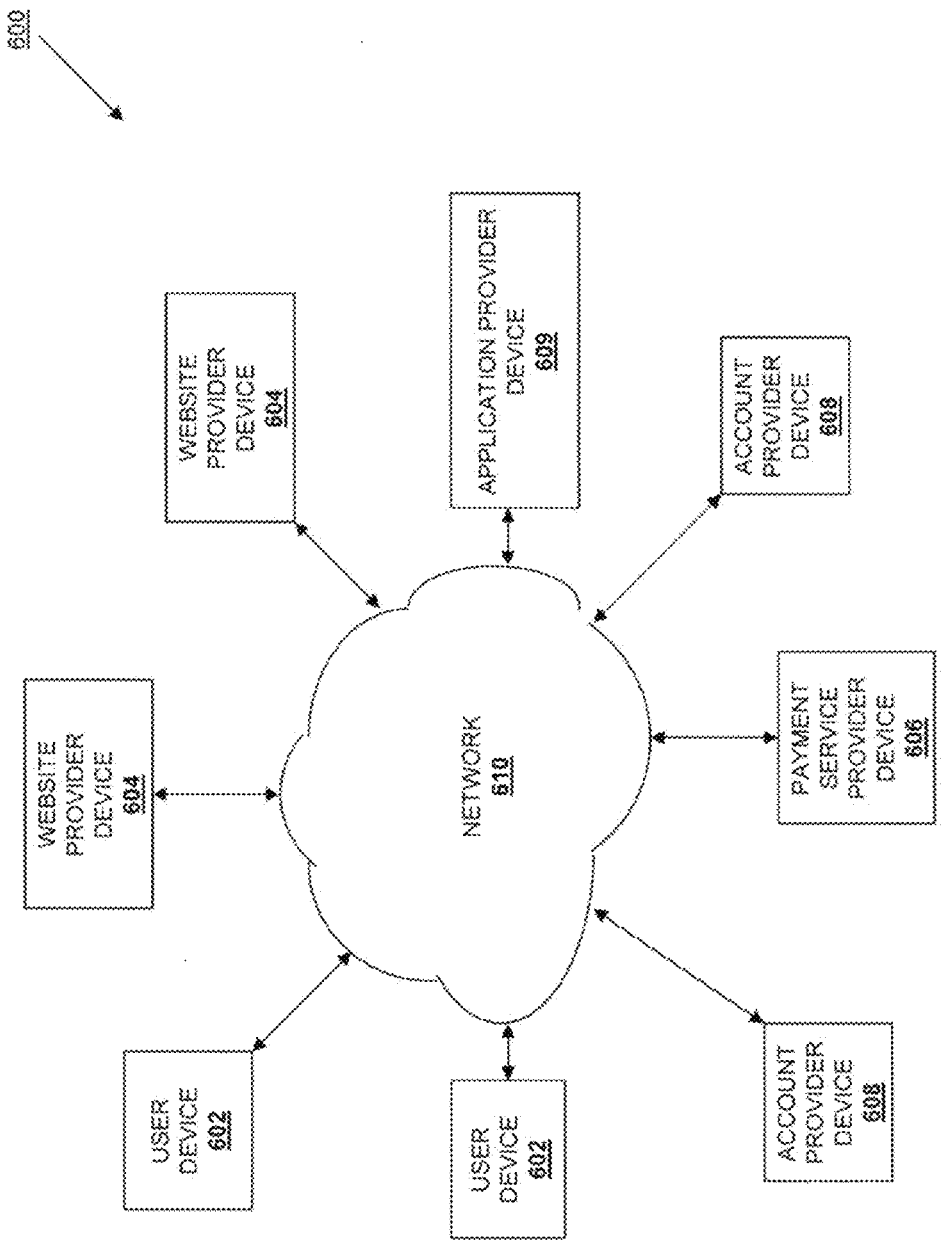
FIG. 6 is a schematic view illustrating an embodiment of a networked system.

Referring now to FIG. 6, an embodiment of a networked system 600 that may be used to provide the expanded icon functionality system described above is illustrated. The networked system 600 includes a plurality of user devices 602, a plurality of website provider devices 604, a payment service provider device 606, a plurality of account holder devices 608, and/or an application provider device 609 in communication over a network 610. Any of the user devices 602 may be the user device 200, discussed above. The website provider devices 604 may be operated by the website providers of the websites discussed above. The payment service provider device 606 may be operated by a payment service provider such as, for example, PayPal Inc. of San Jose, Calif. The account provider devices 608 may be operated by the account providers discussed above such as, for example, credit card account providers, bank account providers, savings account providers, and a variety of other account providers known in the art. The application provider device 609 may be operated by the application providers o the applications discussed above.

The user devices 602, website provider devices 604, payment service provider device 606, account provider devices 608, and/or application provider devices 609 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 600, and/or accessible over the network 610.

The network 610 may be implemented as a single network or a combination of multiple networks. For example, in various embodiments, the network 610 may include the Internet and/or one or more intranets, landline networks, wireless networks, and/or other appropriate types of networks.

The user device 602 may be implemented using any appropriate combination of hardware and/or software configured for wired and/or wireless communication over network 610. For example, in one embodiment, the user device 602 may be implemented as a personal computer of a user in communication with the Internet. In other embodiments, the user device 602 may be a smart phone, personal digital assistant (PDA), laptop computer, and/or other types of computing devices.

The user device 602 may include one or more browser applications which may be used, for example, to provide a convenient interface to permit the user to browse information available over the network 610. For example, in one embodiment, the browser application may be implemented as a web browser configured to view information available over the Internet.

The user device 602 may also include one or more toolbar applications which may be used, for example, to provide user-side processing for performing desired tasks in response to operations selected by the payer. In one embodiment, the toolbar application may display a user interface in connection with the browser application.

The user device 602 may further include other applications as may be desired in particular embodiments to provide desired features to the user device 602. In particular, the other applications may include a payment application for payments assisted by a payment service provider through the payment service provider device 606. The other applications may also include security applications for implementing user-side security features, programmatic user applications for interfacing with appropriate application programming interfaces (APIs) over the network 610, or other types of applications. Email and/or text applications may also be included, which allow the payer to send and receive emails and/or text messages through the network 610. The user device 602 includes one or more user and/or device identifiers which may be implemented, for example, as operating system registry entries, cookies associated with the browser application, identifiers associated with hardware of the user device 602, or other appropriate identifiers, such as a phone number. In one embodiment, the user identifier may be used by the payment service provider device 606 and/or account provider device 608 to associate the user with a particular account as further described herein.

Figure 7:
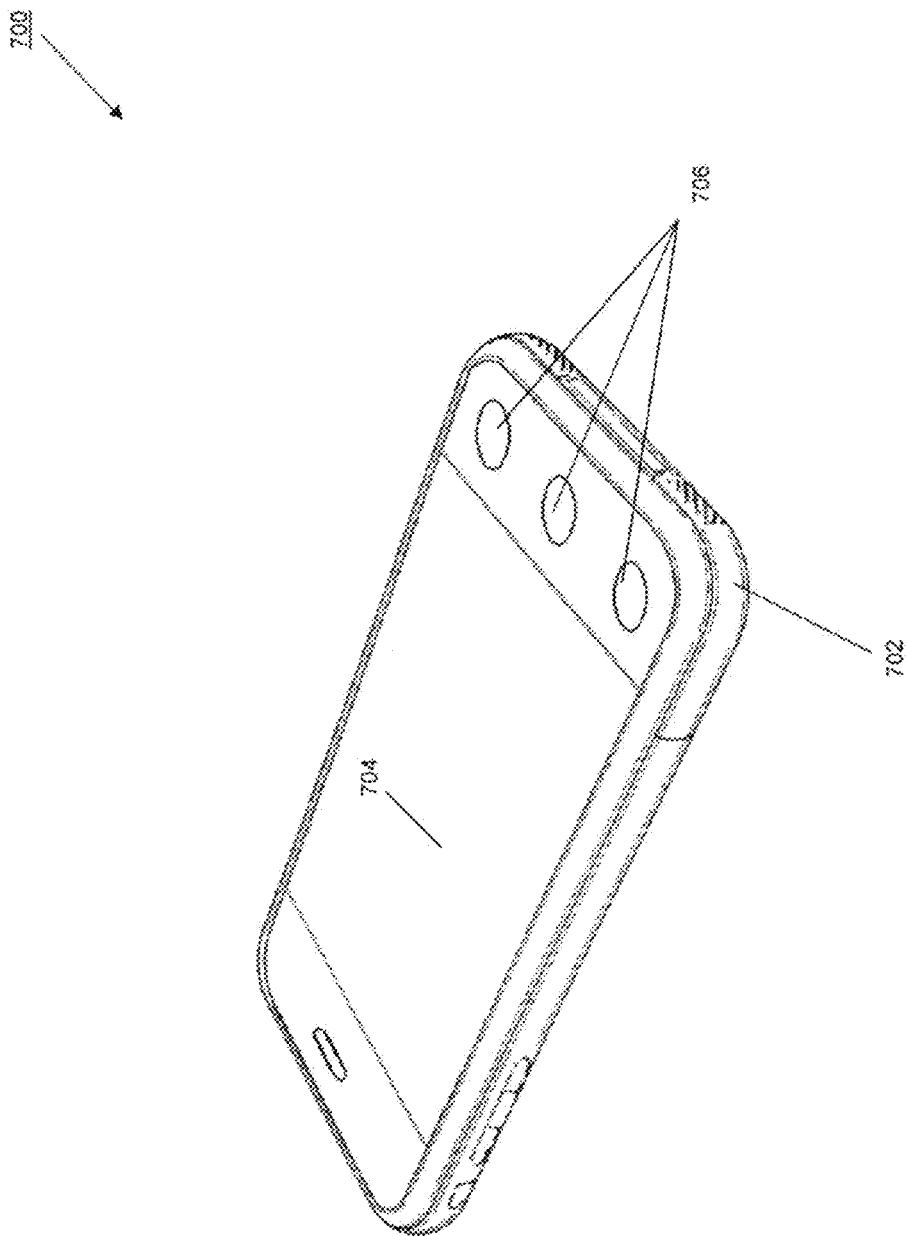
FIG. 7 is a perspective view illustrating an embodiment of a user device.

Referring now to FIG. 7, an embodiment of a user device 700 is illustrated. The user device 700 may be the user devices 200 and/or 602. The user device 700 includes a chassis 702 having a display 704 and an input device including the display 704 and a plurality of input buttons 706. One of skill in the art will recognize that the user device 700 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 8:
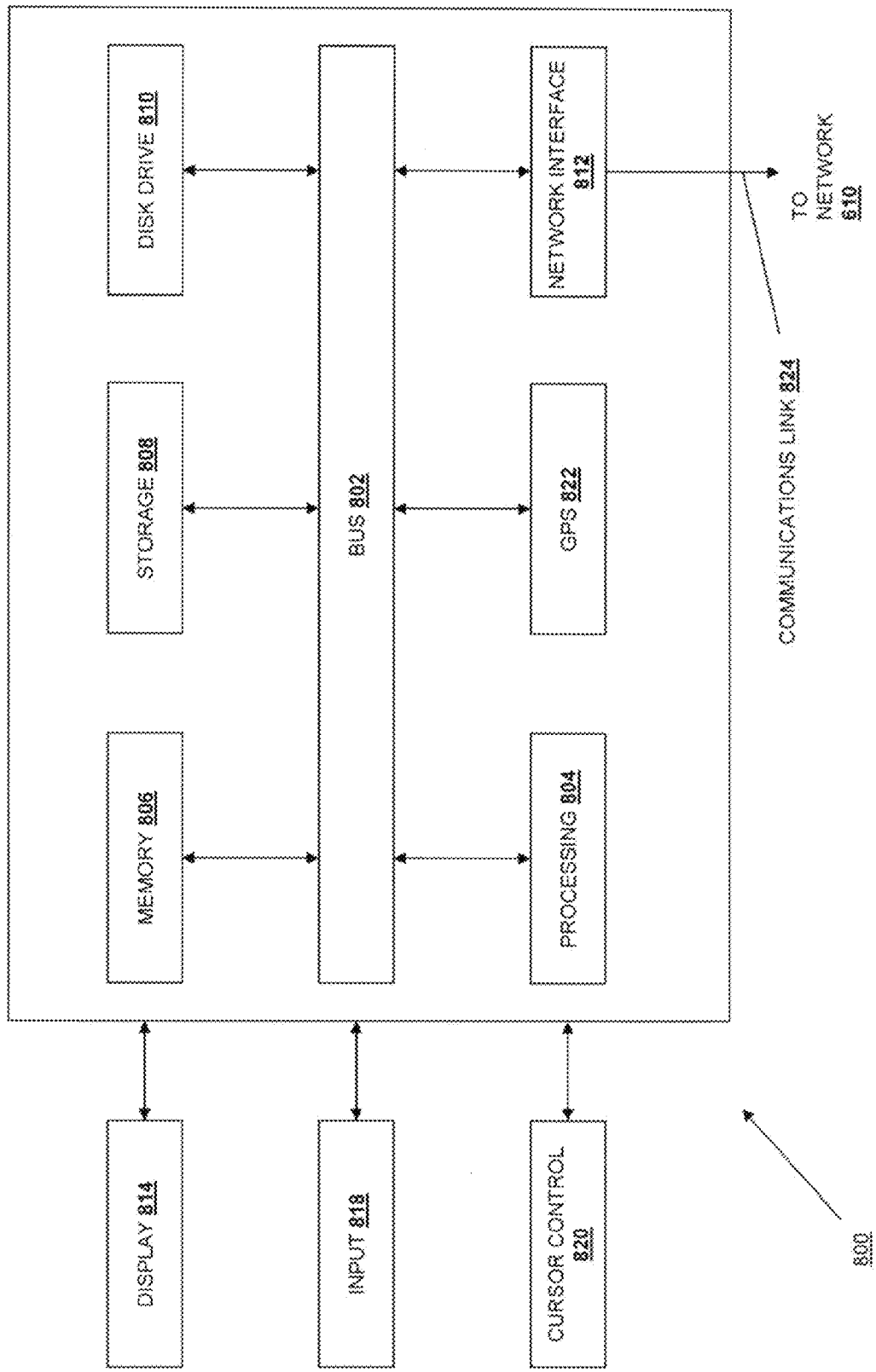
FIG. 8 is a schematic view illustrating an embodiment of a computer system.

Referring now to FIG. 8, an embodiment of a computer system 800 suitable for implementing, for example, the user device 200, the user device 602, the user device 700, the website provider devices 604, the payment service provider device 606, the account provider device 608, and/or the application provider device 609 is illustrated. It should be appreciated that other devices utilized by users, website providers, payment service providers, account providers, and/or application providers in the system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the user device 200, 602, and 700, the website provider device(s) 604, the payment service provider device 606, the account provider device(s) 608, and/or the application provider device 609. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
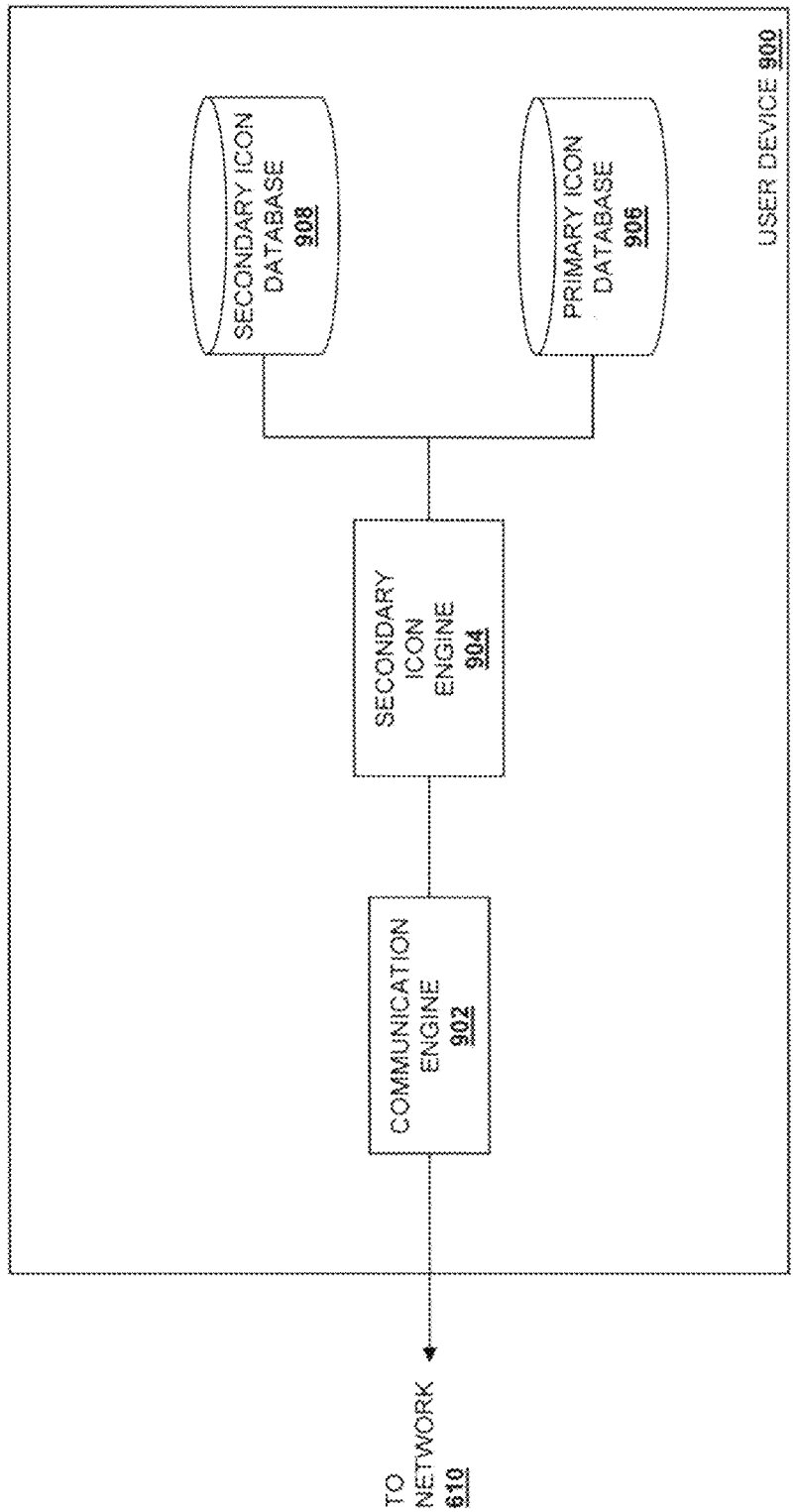
FIG. 9 is a schematic view illustrating an embodiment of a user device.

Referring now to FIG. 9, an embodiment of a user device 900 is illustrated. In an embodiment, the device 900 may be the user device 200, 602, and/or 700. The user device 900 includes a communication engine 902 that is coupled to the network 610 and to a secondary icon engine 904 that is coupled to a primary icon database 906 and a secondary icon database 908. The communication engine 902 may be software or instructions stored on a computer-readable medium that allows the device 900 to send and receive information over the network 610. The a secondary icon engine 904 may be software or instructions stored on a computer-readable medium that is operable to associate secondary icons with their associated secondary icon functions along with primary icons and second user actions in the databases 906 and 908, receive user actions directed to primary icons, retrieve and display secondary icons from the database 906 (and determine the proper locations to display secondary icons), receive selections of secondary icons, perform secondary icon functions retrieved from the database 906, and provide any of the other functionality of the expanded icon functionality system that is discussed above. While the databases 906 and 908 have been illustrated as located in the user device 900, one of skill in the art will recognize that it may be connected to the secondary icon engine 904 through the network 210 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payment applications associated with primary icons; however, a icons may be associated with any other applications, websites, and/or other icon represented entities. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An expanded icon functionality system, comprising:
a touchscreen;
a non-transitory memory; and
one or more hardware processors coupled to the non-transitory memory and configured to read instructions from the non-transitory memory to cause the system to perform operations comprising:
causing a primary application icon that is associated with an application to be displayed on the touchscreen;
detecting a user input on the touchscreen that is directed to the primary application icon;
determining a gesture associated with the user input on the touchscreen;
in instances where the gesture associated with the user input on the touchscreen is determined to be a first gesture, automatically launching a first version of the application;
in instances where the gesture associated with the user input on the touchscreen is determined to be a second gesture that is different than the first gesture:
causing a plurality of secondary icons that are associated with the primary application icon to be displayed concurrently with the primary application icon on the touchscreen; and
receiving a selection of a first secondary icon of the plurality of secondary icons and, in response, automatically launching a second version of the application that is different than the first version of the application;
in instances where the gesture associated with the user input on the touchscreen is determined to be a third gesture that is different than the first gesture and the second gesture:
causing a plurality of tertiary icons that are associated with the primary application icon and that are different than the plurality of secondary icons to be displayed concurrently with the primary application icon on the touchscreen; and
receiving a selection of a first tertiary icon of the plurality of tertiary icons and, in response, automatically performing a tertiary icon function that is associated with the application.

2. The system of claim 1, wherein the tertiary icon function that is associated with the application includes launching a third version of the application that is different than the first version of the application and the second version of the application.

3. The system of claim 1, wherein the first version of the application provides the application using a first language, and wherein the second version of the application provides the application using a second language that is different than the first language.

4. The system of claim 1, wherein the first version of the first application provides the application as a dedicated application, and wherein the second version of the application provides the application as a mobile webpage.

5. The system of claim 1, wherein the first version of the application provides the application using a first currency, and wherein the second version of the application provides the application using a second currency that is different than the first currency.

6. The system of claim 1, wherein the operations further comprise, in instances where the gesture associated with the user input on the touchscreen is determined to be the second gesture:
receiving a selection of a second secondary icon of the plurality of secondary icons;
retrieving information from the application in response to receiving the selection of the second secondary icon; and
causing the information from the application to be automatically displayed as part of the second secondary icon.

7. A method for providing expanded icon functionality, comprising:
causing a primary application icon that is associated with an application to be displayed using a touch input display on a user device;
detecting a user input on the touch input display that is directed to the primary application icon;
determining that the user input on the touch input display provides a first gesture and, in response, launching a first version of the application;
determining that the user input on the touch input display provides a second gesture that is different than the first gesture and that is directed to the primary application icon and, in response:
causing a plurality of secondary icons that are associated with the primary application icon to be displayed concurrently with the primary application icon using the touch screen display; and
receiving a selection of the first secondary icon of the plurality of secondary icons and, in response, automatically launching a second version of the application that is different than the first version of the application;

determining that the user input on the touch input display provides a third gesture that is different than the first gesture and the second gesture and that is directed to the primary application icon and, in response:

causing a plurality of tertiary icons that are associated with the primary application icon and that are different than the plurality of secondary icons to be displayed concurrently with the primary application icon using the touch screen display; and receiving a selection of a first tertiary icon of the plurality of tertiary icons and, in response, automatically performing a tertiary icon function that is associated with the application.

8. The method of claim 7, wherein the tertiary icon function associated with the application includes launching a third version of the application that is different than the first version of the application and the second version of the application.

9. The method of claim 7, wherein the first version of the application provides the application using a first language, and wherein the second version of the application provides the application using a second language that is different than the first language.

10. The method of claim 7, wherein the first version of the application provides the application as a dedicated application, and wherein the second version of the application provides the application as a mobile webpage.

11. The method of claim 7, wherein the second gesture includes a user double tap action on the display at a position at which the primary application icon is being displayed.

12. The method of claim 7, wherein the first version of the application provides the application using a first currency, and wherein the second version of the application provides the application using a second currency that is different than the first currency.

13. The method of claim 7, further comprising:
receiving a selection of a second secondary icon;
retrieving information from the application in response to receiving the selection of the second secondary icon; and
causing the information from the application to be automatically displayed as part of the second secondary icon.

14. A non-transitory machine-readable medium having stored thereon machine-readable instructions executable to cause a machine to perform operations comprising:
causing a primary application icon that is associated with an application to be displayed on a touch input display device;
detecting a user input on the touch input display device that is directed to the primary application icon;
determining a gesture associated with the user input on the touch input display device;
in instances where the gesture associated with the user input on the touch input display device is determined to be a first gesture, launching a first version of the application;
in instances where the gesture associated with the user input on the touch input display device is determined to be a second gesture that is different from the first gesture:

causing a plurality of secondary icons that are associated with the primary application icon to be displayed concurrently with the primary application icon using the touch input display device;
receiving a selection of a first secondary icon of the plurality of secondary icons and, in response, automatically launching a second version of the application that is different than the first version of the application; and in instances where the gesture associated with the user input on the touch input display device is determined to be a third gesture that is different from the first gesture and the second gesture:

causing a plurality of tertiary icons that are associated with the primary application icon and that are different than the plurality of secondary icons to be displayed concurrently with the primary application icon using the touch screen display;

receiving a selection of a first tertiary icon of the plurality of tertiary icons and, in response, automatically performing a tertiary icon function that is associated with the application.

15. The non-transitory machine-readable medium of claim 14, wherein the the tertiary icon function that is associated with the application includes launching a third version of the application that is different than the first version of the application and the second version of the application.

16. The non-transitory machine-readable medium of claim 14, wherein the wherein the first version of the application provides the application using a first language, and wherein the second version of the application provides the application using a second language that is different than the first language.

17. The non-transitory machine-readable medium of claim 14, wherein the first version of the application provides the application as a dedicated application, and wherein the second version of the application provides the application as a mobile webpage.

18. The non-transitory machine-readable medium of claim 14, wherein the second gesture includes a user double tap action on the touch input display device at a position at which the primary application icon is being displayed.

19. The non-transitory machine-readable medium of claim 14, wherein the first version of the application provides the application using a first currency, and wherein the second version of the application provides the application using a second currency that is different than the first currency.

20. The non-transitory machine-readable medium of claim 14, wherein the method further comprises, in instances where the gesture associated with the user input on the touch input display device is determined to be a second gesture that is different from the first gesture:
receiving a selection of the second secondary icon;
retrieving the information from the application in response to receiving the selection of the second secondary icon; and
causing the information from the application to be automatically displayed as part of the second secondary icon.

* * * * *